United States Patent [19]

Habermeier et al.

[11] 3,853,874

[45] Dec. 10, 1974

[54] CERTAIN β-HYDROXY-β-PHENYLETHYL-SUBSTITUTED CYCLIC ACYLUREAS

[75] Inventors: Juergen Habermeier, Allschwil; Hans Batzer, Arlesheim; Daniel Porret, Binningen, all of Switzerland

[73] Assignee: Ciba-Geigy AG, Basel, Switzerland

[22] Filed: June 13, 1972

[21] Appl. No.: 262,421

Related U.S. Application Data

[63] Continuation-in-part of Ser. No. 82,071, Oct. 19, 1970, Pat. No. 3,686,174.

[30] Foreign Application Priority Data

Nov. 27, 1969 Switzerland.................... 17672/69

[52] U.S. Cl. ................................................ 260/257
[51] Int. Cl.. C07d 51/20, C07d 51/30, C07d 49/32
[58] Field of Search.................. 260/257, 309.5, 260

[56] References Cited
FOREIGN PATENTS OR APPLICATIONS 1,954,503   6/1970   Germany ......................... 260/257

Primary Examiner—Donald G. Daus
Assistant Examiner—Anne Marie T. Tighe

[57] ABSTRACT

New mono- or dialcohols of mononuclear, five-membered or six-membered, unsubstituted or substituted N-heterocyclic compounds which contain two NH-groups in the molecule, by reaction of mononuclear, five-membered or six-membered, unsubstituted or substituted N-heterocyclic compounds, for example hydantoin, barbituric acid, uracil, dihydrouracil, parabanic acid and the corresponding derivatives, with styrene oxide to give monoalcohols or dialcohols. These compounds are useful as intermediates for the preparation of diglycidyl compounds as set forth in the German Offenlegungsschrift No. 2,058,206.

8 Claims, No Drawings

CERTAIN β-HYDROXY-β-PHENYLETHYL-SUBSTITUTED CYCLIC ACYLUREAS

This application is a continuation-in-part application of our copending application Ser. No. 82,071, filed Oct. 19, 1970, and now U.S. Pat. No. 3,686,174.

The subject of the present invention are new mono or dialcohols of general formula

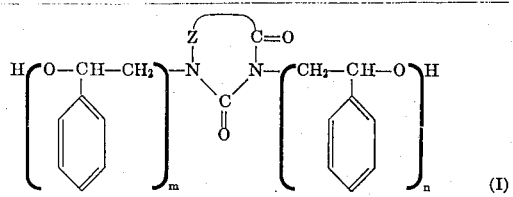

wherein Z denotes a nitrogen-free, divalent radical which is necessary for completing a five-membered or six-membered, unsubstituted or substituted, heterocyclic ring, and $m$ and $n$ each represent an integer having a value of 0 to 30, preferably of 0 to 4, with the sum of $m$ and $n$ having to be at least 1.

The radical Z in the formula (I) preferably consists only of carbon and hydrogen or of carbon, hydrogen and oxygen. It can for example be a radical of formula:

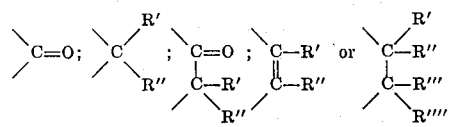

wherein R', R'', R''' and R'''' independently of one another can each denote a hydrogen atom or, for example, an alkyl radical, an alkenyl radical, a cycloalkyl radical or an optionally substituted phenyl radical. These compounds are useful as intermediates for the preparation of diglycidyl compounds.

The monoalcohols or dialcohols of general formula (I) can be manufactured by reacting mononuclear N-heterocyclic compounds of general formula

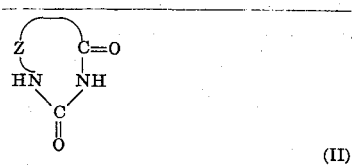

wherein Z has the same meaning as in formula (I), with styrene oxide in the presence of a suitable catalyst.

The addition of styrene oxide to one or both NH groups of the N-heterocyclic compounds of formula (II) can be carried out both in the presence of acid catalysts and of alkaline catalysts, with a slight excess of equivalents of epoxide groups of the styrene oxide being employed per equivalent of NH group of the N-heterocyclic compound of formula (II).

Preferably, however, alkaline catalysts, such as tetraethylammonium chloride or tertiary amines, are used in the manufacture of monoalcohols and dialcohols of formula (II) in which the sum of $m$ and $n$ is 1 or 2. However, alkali halides, such as lithium chloride or sodium chloride, can also be used successfully for this addition reaction; it also takes place without catalysts.

In the manufacture of dialcohols of formula (I) in which the sum of $m$ and $n$ is greater than 2, it is preferable to start from the simple dialcohols of formula (I) in which $m$ and $n$ are each 1, and to add further styrene oxide to both OH groups of this compound in the presence of acid catalysts.

The mononuclear N-heterocyclic compounds of formula (II) used for the manufacture of the new styrene oxide addition products of formula (I) are above all hydantoin, hydantoin derivatives, barbituric acid, barbituric acid derivatives, uracil, uracil derivatives, dihydrouracil and dihydrouracil derivatives, and also parabanic acid.

Hydantoin and its preferred derivatives correspond to the general formula

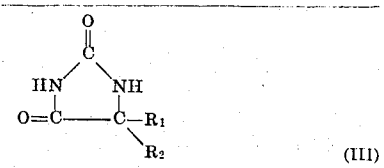

wherein $R_1$ and $R_2$ each denote a hydrogen atom or a lower alkyl radical with 1 to 4 carbon atoms, or wherein $R_1$ and $R_2$ together form a tetramethylene or pentamethylene radical. Hydantoin, 5-methylhydantoin, 5-methyl-5-ethylhydantoin, 5-n-propylhydantoin, 5-isopropyl-hydantoin, 1,3-diaza-spiro (4.5)-decane-2,4-dione, 1,3-diaza-spiro(4.4)-nonane-2,4-dione and preferably 5,5-dimethylhydantoin may be mentioned.

Barbituric acid and its preferred derivatives correspond to the general formula

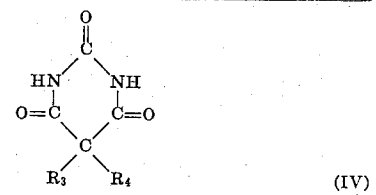

wherein $R_3$ and $R_4$ independently of one another each denote a hydrogen atom, an alkyl radical, an alkenyl radical, a cycloalkyl radical or cycloalkenyl radical, or a substituted or unsubstituted phenyl radical.

The following may be mentioned: barbituric acid, 5-ethylbarbituric acid, 5,5-diethylbarbituric acid, 5-ethyl-5-butylbarbituric acid, 5-ethyl-5-sec.-butylbarbituric acid, 5-ethyl-5-isopentylbarbituric acid, 5,5-diallyl-barbituric acid, 5-allyl-5-isopropylbarbituric acid, 5-allyl-5-sec.-butylbarbituric acid, 5-ethyl-5(1'-methyl-butyl)barbituric acid, 5-allyl-5(1'-methyl-butyl)barbituric acid, 5-ethyl-5-phenylbarbituric acid and 5-ethyl-5(1'-cyclohexen-1-yl)barbituric acid.

Uracil and its preferred derivatives correspond to the general formula

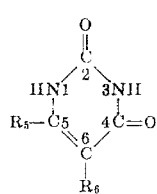

(V)

wherein $R_5$ and $R_6$ both denote hydrogen atoms or one of the two radicals denotes a hydrogen atom and the other radical denotes a methyl group.

Uracils of formula (V) are uracil itself, and also 6-methyl-uracil and thymin (= 5-methyl-uracil).

Dihydrouracil (= 2,4-dioxo-hexahydropyrimidine) and its preferred derivatives correspond to the general formula:

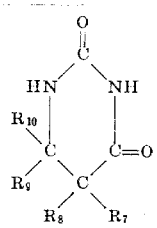

(VI)

wherein $R_7$ and $R_8$ both denote a hydrogen atom or identical or different alkyl radicals, preferably alkyl radicals with 1 to 4 carbon atoms, and $R_9$ and $R_{10}$ independently of one another each denote a hydrogen atom or an alkyl radical.

Preferably, in the above formula, both radicals $R_7$ and $R_8$ denote methyl groups, $R_9$ denotes a hydrogen atom or a lower alkyl radical with 1 to 4 carbon atoms and $R_{10}$ denotes a hydrogen atom. The following may be mentioned: 5,6-dihydrouracil, 5,5-dimethyl-5,6-dihydrouracil (2,4-dioxo-5,5-dimethylhexahydropyrimidine) and 5,5-dimethyl-6-isopropyl-5,6-dihydrouracil (2,4-dioxo-5,5-dimethyl-6-isopropylhexahydropyrimidine).

EXAMPLE 1

Manufacture of 1,3-di-(β-hydroxy-β-phenylethyl)-5,5-dimethylhydantoin

A mixture of 512.6 g of 5,5-dimethylhydantoin (4.0 mols), 500 ml of dimethylformamide and 3.4 g of lithium chloride is stirred at 120°C. 1,058.0 g of styrene oxide (8.8 mols) are added dropwise at 119°–122°C, over the course of 2 hours, to this clear pale yellow solution. The reaction is slightly exothermic, so that the heating bath can periodically be removed. After the dropwise addition, the mixture is stirred for a further 3 hours at 120°C. The clear, orange-coloured solution is concentrated at 85°C on a rotary evaporator under a waterpump vacuum and is subsequently dried at 90°C (0.1 mm Hg). 1,473.0 g of a clear, orange-brown, highly viscous resin (100 percent of theory) are obtained.

This crude 1,3-di-(β-hydroxy-β-phenylethyl)-5,5-dimethylhydantoin can be purified by vacuum distillation. 70 percent of the material employed distil at 260°C under 0.3 mm Hg. A colourless to pale yellow, viscous liquid is obtained, which on cooling solidifies to a glassy brittle mass. This substance is pure 1,3-di-(β-hydroxy-β-phenylethyl)-5,5-dimethylhydantoin.

| Elementary analysis shows | found | calculated |
|---|---|---|
| | 68.46% C | 68.46% C |
| | 6.56% H | 6.57% H |
| | 7.58% N | 7.60% N |

Determination of the molecular weight by vapour pressure osmometry in acetone shows a molecular weight of 365 (theory 368.42).

The infra-red spectrum (material ground with Nujol) shows, inter alia, through the presence of intensive absorptions at 3,450 cm$^{-1}$ (—OH), 1,758 cm$^{-1}$ and 1,685 cm$^{-1}$ (C=O) and 697 cm$^{-1}$, that the desired substance is obtained.

The proton-magnetic resonance spectrum (60 Mc H—NMR recorded in CDCl$_3$ at 35°C with tetramethylsilane (TMS) as an internal standard) proves the structure shown below, through the presence of the signals, quoted below, for the 24 protons present:

| | | | |
|---|---|---|---|
| 10 protons | δ=7.39 | (Singlet) | 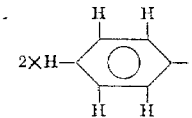 |
| 2 protons | δ=5.16<br>5.05<br>4.97 | Triplet | 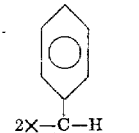 |
| 4 protons | δ=3.92<br>3.87<br>3.79 | Fine-structured triplet. | $2\times\!\!>\!\!N\text{—}CH_2\text{—}$ |
| 2 protons | δ=3.43<br>3.35 | Doublet | 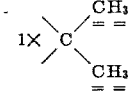 |
| 6 protons | δ=1.15 | (Singlet) | 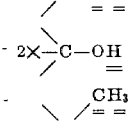 |

This at the same time shows that the structural element

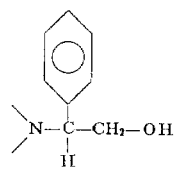

is not present, since in this element the OH signal would have to be a triplet; furthermore, the proton on the tertiary C atom would in this case be expected at about δ = 3.80, and furthermore the protons of the —CH₂ group would then have to appear at about δ = 3.0.

The new substance thus corresponds to the following structure

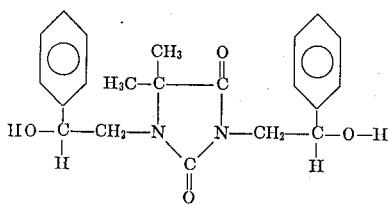

EXAMPLE 2

Manufacture of 1,3-di-(β-hydroxy-β-phenylethyl)-6-methyluracil

A solution of 63 g of 6-methyluracil (0.5 mol) and 0.5 g of lithium chloride in 800 ml of dimethylformamide is stirred at 120°C. 132.2 g of styrene oxide (1.1 mols) are added dropwise, with stirring, over the course of 2 hours. After the dropwise addition, the mixture is stirred for a further 2 hours at 130°C. The resulting clear, yellow solution is concentrated on a rotary evaporator at 80°C, under a water-pump vacuum, and is subsequently dried at 80°C (0.1 mm Hg). 180 g (98.3 percent) of crude 1,3-di-(β-hydroxy-β-phenylethyl)-6-methyluracil are obtained in the form of a clear, transparent, light yellow, solid mass. For purification, the product is recrystallised from ethanol/water. 116.5 g of pure product are obtained; the melting point is about 139.5° – 141°C.

Elementary analysis shows 6.04 % H (calculated, 6.05 % H). The infra-red spectrum shows, inter alia, through the absence of the N—H frequencies and through the presence of an intensive absorption of 3,340 cm⁻¹, that the desired substance is obtained.

The proton-magnetic resonance spectrum (60 Mc N-NMR, recorded in CDCl₃ at 35°C, with TMS as the standard) shows, through the following signals, that the new dialcohol has the structure given below: According to integration, 22 protons are present (theory, 22).

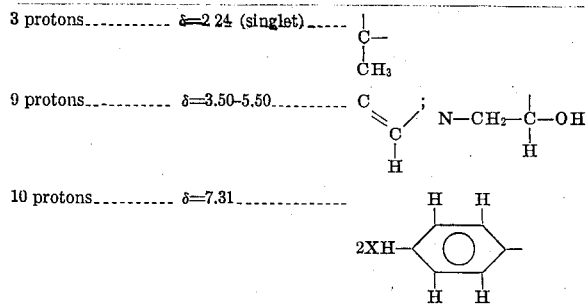

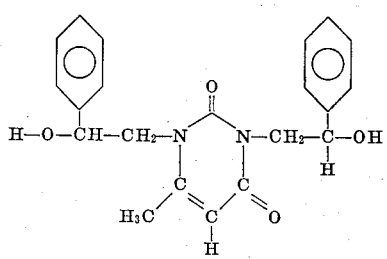

EXAMPLE 3

Manufacture of 1,3-di-(β-hydroxy-β-phenylethyl)-5,5-dimethyl-6-isopropyl-5,6-dihydrouracil A mixture of 184.24 g of 5,5-dimethyl-6-isopropyl-5,6-dihydrouracil (= 2,4-dioxo-5,5-dimethyl-6-isopropylhexahydropyrimidine) (1 mol), 1.27 g of lithium chloride and 1 litre of dimethylformamide is stirred at 150°C. 252.5 g of styrene oxide (2.1 mols) are slowly added dropwise over the course of 3 hours. After the dropwise addition, the mixture is stirred for a further 3 hours at 150°C. The light brown, slightly cloudy solution is clarified by Hg. and concentrated on a rotary evaporator at 80°C under a waterpump vacuum, and subsequently dried at 80°C/0.1 mm Hz. 349 g of an orange-brown, clear and transparent slightly tacky, solid residue (82.5 percent of theory) are obtained. The infra-red spectrum shows, through the absence of N—H frequencies and through OH absorptions, that 1,3-di-(β-hydroxy-β-phenylethyl)-5,5-dimethyl-6-isopropyl-5,6-dihydrouracil has been produced, as desired.

EXAMPLE 4

Manufacture of 1,3-di-(β-hydroxy-β-phenylethoxy-β-phenylethoxy-β-phenylethyl)-5,5-dimethylhydantoin A solution of 101 g of the 1,3-di-(β-hydroxy-β-phenylethyl)-5,5-dimethylhydantoin (0.274 mol), manufactured according to Example 1, in 500 ml of dioxane is mixed with 3.0 ml of 47 percent strength boron fluoride diethyl etherate solution in diethyl ether and stirred at 80°C, whereupon a claret solution results. 197.5 g of styrene oxide (1.642 mol) are slowly added dropwise to this solution over the course of 45 minutes. The reaction is so strongly exothermic that the heating bath is removed, and the contents of the flask reach a maximum temperature of 87°C. After the addition of styrene oxide, the mixture is further stirred until the batch has cooled to room temperature. The pH of the solution, which is now pale yellow, is 4. The pH value is adjusted to 7.0 by means of 30 percent strength sodium hydroxide solution. The solution is concentrated to 250 ml on a rotary evaporator and then cooled (10°C) and filtered to remove inorganic constituents. Thereafter the filtrate is completely concentrated (60°C/waterpump vacuum) Drying takes place at 90°C/0.1 mm Hg. 245 g of a slightly yellowish, clear, solid resin are obtained. The increase from 101 g to 245 g shows that 4 mols of styrene oxide have reacted per mol of starting diol.

| Elementary analysis shows: | found | calculated |
|---|---|---|
| | | (for 4 mols of styrene oxide per mol of diol) |
| | 75.1% C | 75.1% C |
| | 6.6% H | 6.6% H |
| | 3.3% N | 3.3% N |

This ratio can also be determined by means of the proton-magnetic resonance spectrum (60 Mc—HNMR) from the integration ratio of the methyl protons to the aromatic protons; here again it is found that essentially the following is the correct average structure:

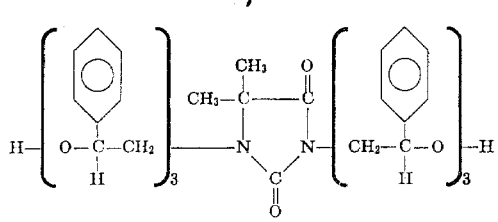

EXAMPLE 5

Manufacture of 3-(β-hydroxy-β-phenylethyl)-5,5-dimethylhydantoin

A mixture of 508 g of 5,5-dimethylhydantoin (3.96 mols), 5.05 g of lithium chloride and 550 ml of dimethylformamide is stirred at 125°C. 480.6 g of styrene oxide (4.0 mols) are added dropwise thereto over the course of 90 minutes. Thereafter the mixture is stirred for a further 180 minutes at 125°C. The reaction mixture is filtered and concentrated at 90°C on a rotary evaporator under a waterpump vacuum, and the residue is subsequently dried to constant weight at 90°C under 0.1 mm Hg. 983 g (99.9 percent theory) of a yellow-white crystal mass are obtained. For purification, the product can be recrystallised from acetone. Colourless, glistening, fine crystals are obtained, which melt at 146°–146.5°C. Elementary analysis shows the following values:

| found | calculated |
|---|---|
| 62.86 % C | 62.89 % C |
| 6.4 % H | 6.5 % H |
| 11.5 % N | 11.3 % N |

The infra-red spectrum (material ground with Nujol) shows the OH absorption at 3,430 cm⁻¹, and the carbonyl frequencies appear at 1,760, 1,730 and 1,690 cm⁻¹.

The proton-magnetic resonance spectrum (60 Mc H—NMR, recorded in CDCl₃ at 35°C, against TMS) shows the following signals:

| | | | |
|---|---|---|---|
| 6H | δ=1.32 | (Singlet) | ⟩C⟨CH₃/CH₃ |
| 3H | δ=3.75–4.00 | (Multiplet) | —N—CH₂— and —OH |
| 1H | δ=5.0 | (Multiplet) | ⟨C₆H₄⟩—C(H)— |
| 1H | δ=6.50 | (Multiplet) | N₁—H |
| 5H | δ=7.34 | (Singlet) | Aromatic protons. |

In total, 16 protons are thus found (theory = 16).

The mass spectrum is also in accord with the structure given below. The molecule-ion is found at 248, which agrees with the theoretical molecular weight of 248.3. Furthermore, the following characteristic fragments are found: 231 (248—OH): 171 (238—C₆H₅): 142 (248—C₆H₅CO) 127 (=142—CH₃) etc.

The new monoalcohol thus has the following structure

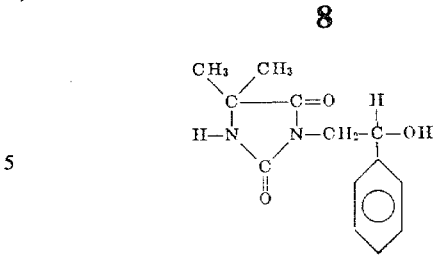

EXAMPLE 7

Manufacture of 1,3-di-(β-hydroxy-β-phenylethyl)-5-isopropylhydantoin

A mixture of 60.08 g of 5-isopropylhydantoin (0.4226 mol), 300 ml of dimethylformamide and 0.5 g of lithium chloride is stirred at 120°C. 132.1 g of styrene oxide (1.0995 mols) are added dropwise thereto over the course of 3 hours. Thereafter the mixture is allowed to continue reacting for a further 180 minutes at 130°C. The filtered reaction mixture is concentrated at 80°C on a rotary evaporator under a waterpump vacuum and is subsequently dried to constant weight at 85°C/0.1 mm Hg. 161 g of a light yellow crystal mass (99.6 percent of theory) are obtained, and this mass can be purified by recrystallisation from ethanol. Elementary analysis shows 6.87 % H (theory 6.85 % H) and 7.45 % N (theory 7.33 % N); the proton-magnetic resonance spectrum is also in agreement with the following structures:

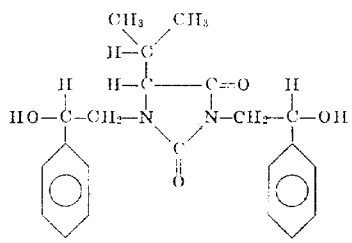

EXAMPLE 8

Manufacture of 1,3-di-(β-hydroxy-β-phenylethyl)-5-ethyl-5-phenylbarbituric acid

A mixture of 116.12 g of 5-ethyl-5-phenylbarbituric acid (0.5 mol), 0.5 g of lithium chloride and 500 ml of dimethylformamide is stirred at 120°C. 132.16 g of styrene oxide (1.1 mols) are added dropwise to this clear solution over the course of 75 minutes. The mixture is then further left at 130°C for 205 minutes, cooled to 50°C, filtered and concentrated at 75°C on a rotary evaporator under a waterpump vacuum, and thereafter dried to constant weight at 85°C and 0.1 mm Hg.

235 g of a clear, light yellow, viscous substance (99.3 percent of theory) are obtained. The proton-magnetic resonance spectrum (60 Mc H—NMR, recorded in CDCl₃ at 35°C, against TMS) shows, inter alia, through the integration ratio of the signals at δ = 0.8 (multiplet of the —CH₂—CH₃ group) and δ = 7.3 (multiplet of the aromatic protons) of 3/15, that the substance has the following formula:

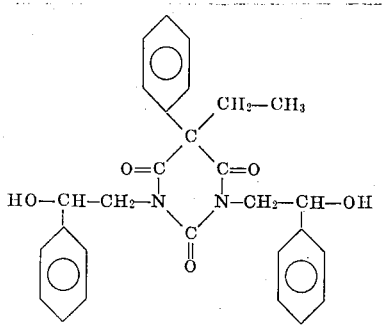

We claim:
1. A monoalcohol or dialcohol of the formula

$$H \left[ O-CH-CH_2 \underset{\underset{\text{Ph}}{|}}{} \right]_m N \overset{Z}{\underset{\underset{O}{\parallel}}{\diagdown}} \overset{C=O}{\diagup} N \left[ CH_2-CH-O \underset{\underset{\text{Ph}}{|}}{} \right]_n H \quad (I)$$

wherein Z represents a member selected from the group consisting of a divalent group of formulae

wherein R', R'', R''' and R'''' each represents a member selected from the group consisting of alkyl with 1 to 4 carbon atoms, alkenyl with 2 to 4 carbon atoms, cyclohexyl, cyclohexenyl and phenyl, or when the residue Z represents the formulae $$\diagdown \underset{\diagup}{C} \overset{R'}{\underset{R''}{\diagdown}},$$

R' and R'' together can also form a member selected from the group consisting of divalent tetramethylene and pentamethylene ring, and $m$ and $n$ each represents an integar having a value of 0 to 3 with the sum of $m$ and $n$ having to be at least 1.

2. A compound as claimed in claim 1 which is 1,3-di-($\beta$-hydroxy-$\beta$-phenylethyl)-5,5-dimethylhydantoin.

3. A compound as claimed in claim 1 which is 1,3-di-($\beta$-hydroxy-$\beta$-phenylethyl)-6-methyluracil.

4. A compound as claimed in claim 1 which is 1,3-di-($\beta$-hydroxy-$\beta$-phenylethyl)-5,5-dimethyl-6-isopropyl-5,6-dihydrouracil.

5. A compound as claimed in claim 1 which is 1,3-di-($\beta$-hydroxy-$\beta$-phenylethoxy-$\beta$-phenylethoxy-$\beta$-phenylethyl)-5,5-dimethylhydantoin.

6. A compound as claimed in claim 1 which is 3-($\beta$-hydroxy-$\beta$-phenylethyl)-5,5-dimethylhydantoin.

7. A compound as claimed in claim 1 which is 1,3-di-($\beta$-hydroxy-$\beta$-phenylethyl)-5-isopropylhydantoin.

8. A compound as claimed in claim 1 which is 1,3-di-($\beta$-hydroxy-$\beta$-phenylethyl)-5-ethyl-5-phenylbarbituric acid.

* * * * *